United States Patent [19]
Maiershofer

[11] 3,802,644
[45] Apr. 9, 1974

[54] DIFFERENTIAL BELT WEB TRANSPORT

[75] Inventor: Karl Maiershofer, Scottsdale, Ariz.

[73] Assignee: Motorola, Inc., Franklin Park, Ill.

[22] Filed: Oct. 1, 1971

[21] Appl. No.: 185,586

[52] U.S. Cl. ........................ 242/192
[51] Int. Cl. ........................ G11b 15/32
[58] Field of Search........................ 242/192, 195, 210; 179/100.2 Z

[56] References Cited

UNITED STATES PATENTS

| | | | |
|---|---|---|---|
| 3,222,003 | 12/1965 | Guerth | 242/192 |
| 2,743,878 | 5/1956 | Masterson | 242/192 |
| 3,305,186 | 2/1967 | Burdork et al. | 242/192 |

*Primary Examiner*—George F. Mautz
*Attorney, Agent, or Firm*—Vincent J. Rauner; Victor Myer

[57] ABSTRACT

The specification discloses a web transporter such as a tape recorder wherein a drive belt is disposed around capstans, a drive pulley and an idler, the supply reel including the tape thereon is belt-driven, and the take-up reel including the tape thereon is edge-driven by a capstan and the drive belt reeved therearound. Four-bar-linkage means are disclosed for mounting the supply and take up reels so that the points of engagement of the tape on the reels are maintained irrespective of the tape inventory on the reels.

Tension in the tape is achieved by the dimensions of the system components and constant tension is maintained in the tape by the mechanism during recording or playback in either direction. The four-bar-linkage enables better counterbalancing of the operating parts to be maintained.

33 Claims, 8 Drawing Figures

INVENTOR.
Karl Maiershofer
BY Mueller & Aichele
ATTY'S.

INVENTOR
Karl Maiershofer
BY Mueller & Aichele
ATTY'S.

INVENTOR
Karl Maiershofer
BY
Mueller & Aichele
ATTY'S.

INVENTOR
Karl Miershofer
BY
Mueller & Aichele
ATTY'S.

INVENTOR.
Karl Maiershofer
BY Mueller & Aichele
ATTY'S.

INVENTOR.
Karl Maiershofer

BY Mueller & Aichele
ATTY'S.

DIFFERENTIAL BELT WEB TRANSPORT

BACKGROUND OF THE INVENTION

This invention relates to web transporting means and methods such, for example, as tape transporting means and methods for a magnetic tape recorder, more particularly it relates to such web transporting means and methods including a supply reel and a take-up reel driven by differential belt means whereby constant tension is maintained in such web as it moves from the supply reel to the take-up reel and it is an object of the invention to provide improved means and methods of this character.

It is a further object of the invention to provide an improved differential belt drive for two rotating members such as reels, pullesy, wheels, or the like, whereby a constant differential in rotational speed is maintained between the rotating members.

In magnetic tape recorders and reproducers, magnetic tape moves from a supply reel to a take-up reel and in the reverse direction, and in so doing moves past record, playback, erase head (i.e., transducing heads) and the like. As the magnetic tape moves from the supply reel to the take-up reel, for example, the supply reel decreases in diameter and the take-up reel increases in diameter. In this process it is difficult to maintain constant tension in the magnetic tape as it moves past the transducing heads, and it is very important that the tension in the tape be made as constant as possible, and that its speed past the transducing heads be as constant as possible, in either case, irrespective of how much inventory of tape there is on the supply and take-up reels. Unless constant tension and speed are maintained, there is apt to be a flutter of the tape with consequent distortion in the recorded information.

Tape recorders intended for sophisticated environments, such for example, as on missiles, space rockets and the like are subjected to severe vibrations and severe shock forces. It is also necessary that the direction of tape transport be changed, not only when the supply reel is finished, but at any other time when it is desired to play back the information which is already recorded. Moreover, it is desirable that recording may be done while the tape is travelling in either direction correspondingly for playback. Under all of these circumstances of shock, vibration, rapid reversal of tape direction, there is, according to the present state of the art, a virtual impossibility of maintaining constant tape tension as the tape moves past the transducing heads. Particularly under the conditions of rapid reversal of direction of tape transport, it is difficult according to the present state of the art to prevent one reel or the other from overrunning and thus throwing tape off of the desired transport path with the resultant risk of fouling the tape onto the structure as well as degrading the information that may be recorded thereon.

Accordingly, it is an object of the invention to provide an improved web or magnetic tape recording apparatus which is not subject to the defects of the prior art.

It is a further object of the invention to provide an improved magnetic tape recorder of the nature indicated wherein the tape tension as it moves past the transducting heads is independent of speed of transport, inventory of tape on the supply and take-up reels, and can be predetermined to a specific value.

It is a further object of the invention to provide an improved tape recorder of the character indicated wherein the tape when moving from a supply reel to a take-up reel has constant and defined tape tension, low flutter, the recorder is capable of high speed operation with fast reverse, is simple, has fewer parts and is suitable for severe shock and vibrational operation.

It is a further object of the invention to provide an improved tape recorder of the character indicated utilizing a drive belt wherein the tape tension is achieved by the differential produced by edge driving the take-up reel at a belt surrounded capstan and belt driving the supply reel, the automatic reverse is controlled by the drive motor by means of reversible one-way clutch, and rigid coupling of the tape reels and capstans is achieved by means of a four-bar link.

SUMMARY OF THE INVENTION

In carrying out the invention in one form, there is provided in a magnetic tape recording and reproducing mechanism, the method of driving a tape supply reel and a take-up reel with a constant predetermined tension in the tape during its transfer from supply reel to take-up reel comprising the steps of: providing a drive belt with a predetermined tension therein at least around a capstan and a roller and means for driving the belt, providing capstan and belt drive of the take-up reel, and providing belt drive only of the supply reel.

In carrying out the invention according to another form, there is provided a magnetic tape recording and reproducing mechanism comprising: a supply reel adapted to have an inventory of tape thereon; a take-up reel adapted to have an inventory of tape thereon; means for transferring tape from the supply reel to the take-up reel; transducing means disposed to be engaged by the tape as it is transferred from the supply reel to the take-up reel; means for maintaining substantially constant tension in the tape comprising capstan means, idler roller means, a drive belt reeved around the capstan means and idler roller, the drive belt having a certain thickness and a predetermined tension therein, means for driving the belt, mounting means for the supply reel pivotally arranged for bringing the periphery of the inventory of tape on the supply reel into a position against the belt on the capstan means, mounting means for the take-up reel pivotally arranged for bringing the inventory of tape on the take-up reel into position against the belt between the capstan means and the idler roller means; and rigid linkage means connecting the mounting means for holding the supply reel and the take-up reel in the appropriate positions.

DESCRIPTION OF THE PREFERRED EMBODIMENTS

While, throughout this disclosure, the invention will be described in connection with a magnetic tape recorder it will be understood that this is exemplary and that the invention has equal application to any apparatus wherein a web-like material, including paper, for example, is transferred from one reel called the supply reel to a second reel called the take-up reel, and, in which it is desired to maintain constant tension in the web-like material as it moves past a particular point. The constant tension in the web-like material is to be maintained, according to the invention, irrespective of the amount of web-like material on the supply reel as compared with the take-up reel, the speed of web transfer, the severity of shock or vibration environments, the reversal of direction of web travel, the sizes of the reels and other factors.

Moreover, it will be understood that the invention has application to drives for rotating members generally wherein a small differential in speed is desired.

Essentially the system forming the subject matter of the invention comprises one or more capstans and idler rollers around which a drive belt is reeved and with respect to which the supply reel with tape thereon and the take-up reel with tape thereon are disposed, so that the periphery of the take-up reel is held against a capstan and the belt therearound whereby this reel is edge-driven and so that the periphery of the supply reel is held against the belt between the capstan and any other roller, such as the idler roller, whereby this reel is belt-driven. This combination of drive positions tends to give the tape speed at the take-up reel an increased value over that of the tape leaving the supply reel. In this system the principal factors dictating the tension in the tape are the drive belt thickness, the elasticity of the drive belt and the diameter of the drive belt capstans. These factors can of course be changed to achieve the ideal combination of factors including the tape tension.

Figure 2:
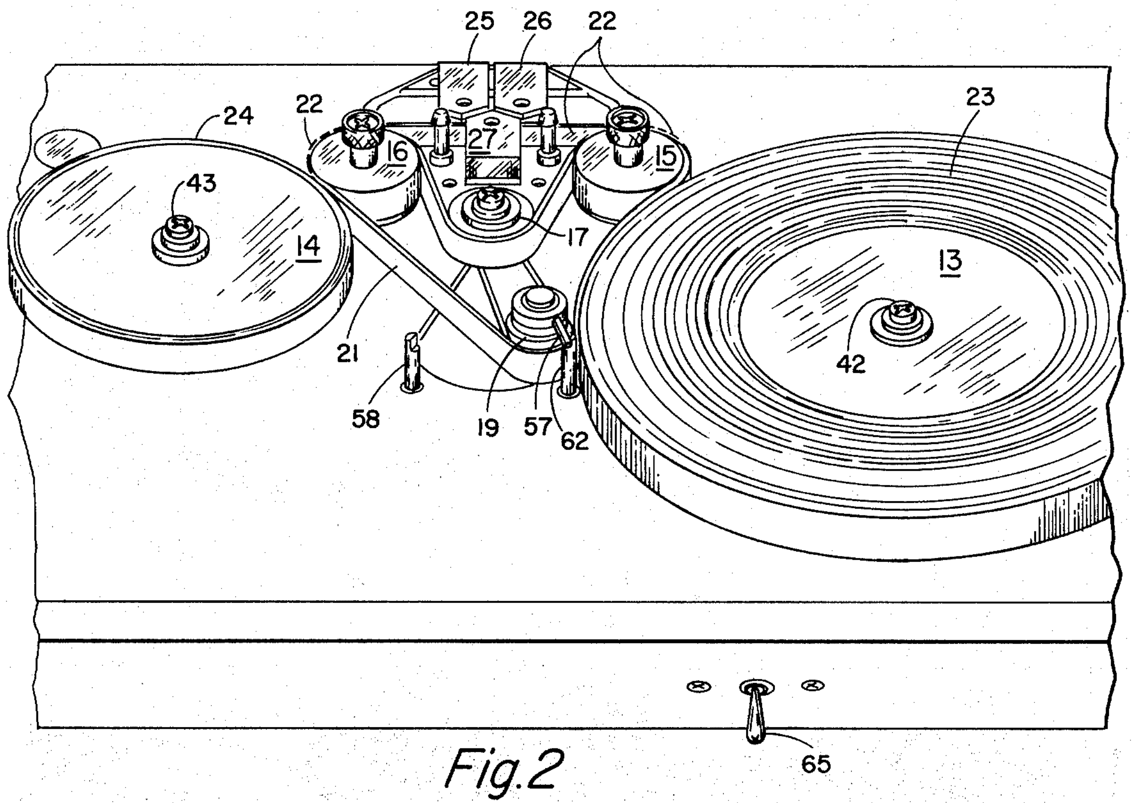
FIG. 2 is a fragmentary top view in perspective of one form of apparatus embodying the invention.
Figure 3:
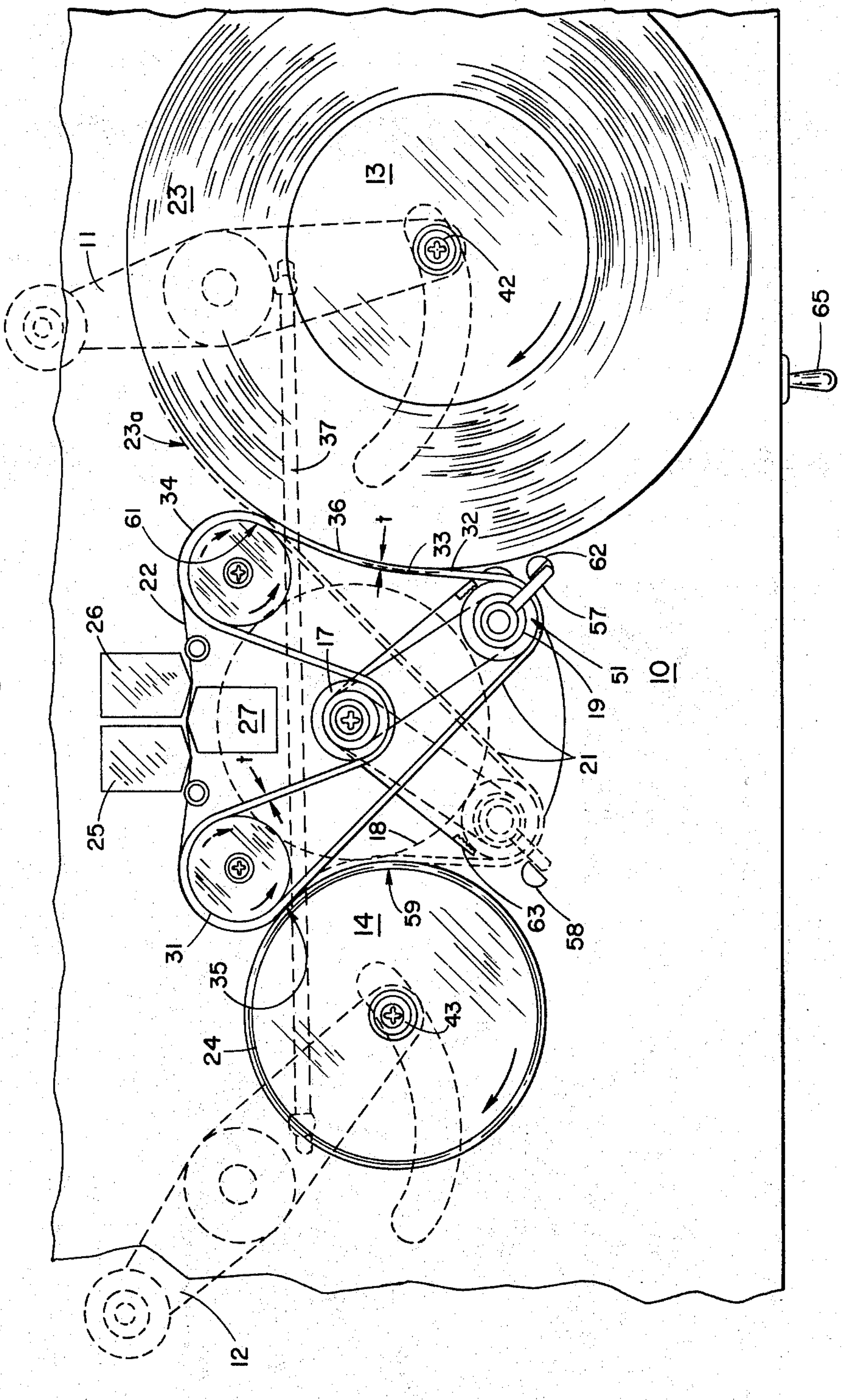
FIG. 3 is a fragmentary top plan view of the apparatus shown in FIG. 2.
Figure 4:
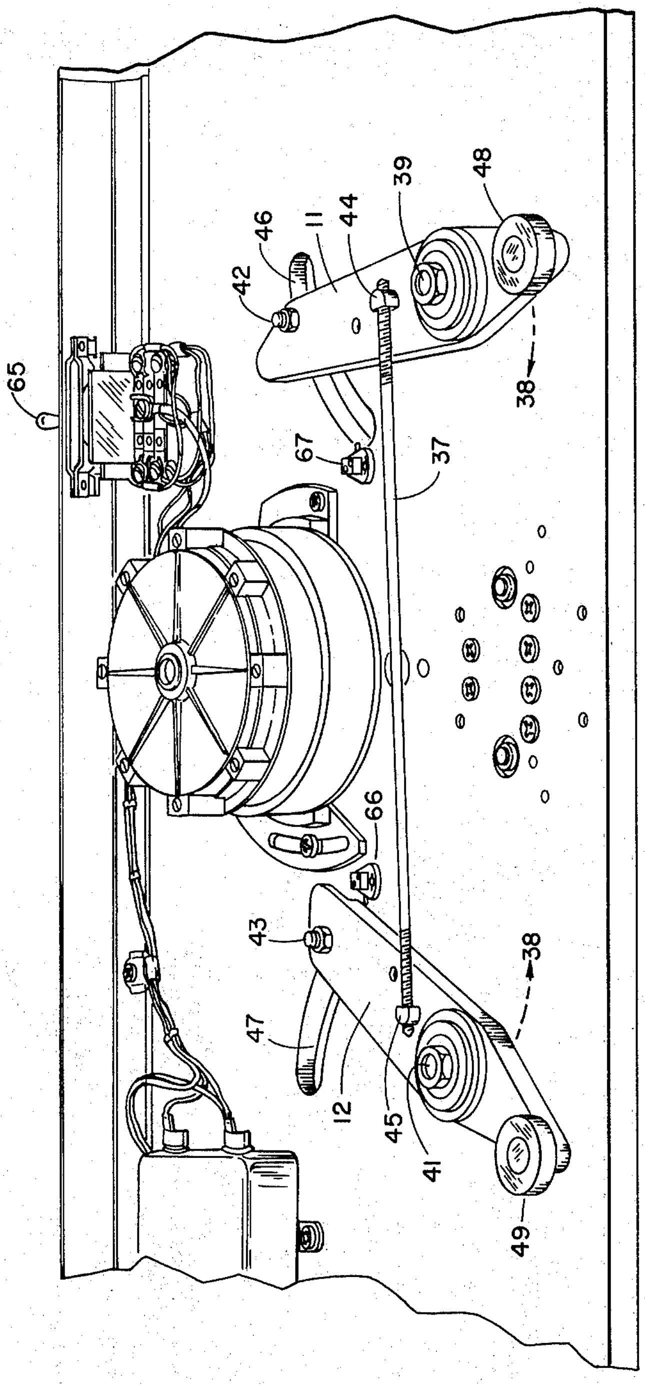
FIG. 4 is a bottom view in perspective of the apparatus shown in FIGS. 2 and 3.

Referring to FIGS. 2, 3 and 4 of the drawings the invention is shown as comprising a support structure 10, a pair of arms 11 and 12 pivotally mounted on the support 10, a pair of reels 13 and 14 rotatably mounted on the arms 11 and 12 respectively, a pair of capstans 15 and 16 rotatably mounted on the support 10, a drive pulley 17 rotatably mounted on the support 10 and adapted to be driven by a motor 18, a combined idler roller and one-way clutch 19, a drive belt 21 reeved around the capstans 15 and 16, the drive pulley 17 and the idler roller 19 (sometimes referred to as an idler), a magnetic tape or other web-like material 22, a portion or inventory 23 of the tape or web-like material being shown on the reel 13 as a supply reel and a second portion or inventory 24 of the tape or web-like material being shown on the reel 14 as a take-up reel. The portion 24 shown in FIG. 2 is thicker than that on FIG. 3 in order to show travel of tape from the supply reel 13 to the take-up reel 14.

Also disposed on the support structure 10 are a record head 25, a playback head 26 and an erase head 27 each having a triangular portion including an apex which bears against the surface of the tape 22, a pair of guide pins 28 and 29 being disposed, as shown, so as to maintain the tape in contact with the record, playback and erase heads (transducing heads) respectively.

It will be noted in considering FIGS. 2 and 3 that the reel 14 with tape 24 thereon is disposed with its periphery or edge against that portion 31 of the drive belt 21 reeved around the capstan 16. This is referred to in the art as edge-driven. On the other hand, the tape 23 on reel 13 is disposed with its periphery against that portion 32 of the drive belt 21 which lies between the capstan 15 and the idler 19. This is referred to in the art as belt-driven. Between the capstan 15 and the idler 19 the drive belt is in contact with the periphery of the tape 23 on the supply reel only and that periphery does not engage the periphery of the capstan 15 or that portion of the belt which is reeved therearound. Accordingly the peripheral velocity of tape 23 on the reel 13 is determined by the velocity of the belt portion 32 whereas the peripheral velocity of tape 24 on the reel 14 is determined by the peripheral speed of the belt portion 31 and the capstan 16. It will therefore be understood, that the peripheral speed of the reel 14 (tape portion 24) will be greater than the peripheral speed of the reel 13 (tape portion 23). This differential is the mechanism by virtue of which tension is developed in the tape as it moves from a supply reel to the take-up reel, there being tension in the drive belt.

The drive belt 21, which may be of any appropriate material such for example as neoprene rubber, materials of greater tensil strength such as Kapton, or any other suitable material and is reeved around the capstans 15 and 16, the drive pulley 17, and the idler 19 with a certain pre-tension designated at $T_{BO}$, the pre-tension being sufficient to insure that no slippage occurs around the capstans, drive pulley and idler roller. The drive belt 21 is driven at constant speed by the pulley 17 which is directly connected to the constant speed motor 18. The drive belt 21 has a thickness $t$ and is shown with a neutral axis 33 which maintains a uniform length even though the various portions of the belt may change lengths as they move around the capstans and rollers. Since the tape 21 bears directly on the portions of the drive belt as it passes around the capstans 15 and 16, the tape, at the points of engagement 34 and 35, has a linear velocity, $V_T$ equal to $\omega_c$ $(R_c + t)$ where $\omega_c$ is equal to the angular speed of the capstan, $R_c$ is the capstan radius and $t$ is the drive belt thickness. Since the reel 14 with its inventory of tape 24 thereon is disposed directly against the portion 31 of the drive belt around capstan 16 (e.g., point 35) the peripheral velocity of the tape portion 24 is the same as the linear velocity of the tape as just described. However, since the supply reel 13 with its inventory of tape 23 thereon is in contact only with the portion 32 of the drive belt and not with the capstan 15, the tape in this area, which may be designated by the reference character 36, has a linear velocity, $V_s$, equal to $\omega_c$ $[R_c + (t/2)]$.

In the absence of any other, or secondary effects, the linear speed of the tape at the take-up reel (point 35) and also at the point 34 will be faster than the speed of the tape at the supply reel (point 36) by the amount, $\Delta V$, equal to $\omega_c (R_c + t) - \omega_c [R_c + (t/2)]$; $\Delta V = \omega_c (t/2)$. The ratio of the difference in velocities, $\Delta V$, to the velocity, $V_s$, of the tape at the supply reel, $\Delta V/V_s$, is equal to $$\frac{\omega_c t/2}{\omega_c\left(R_c+\frac{t}{2}\right)}$$

This reduces to $$\frac{\Delta V}{V_s}=\frac{\frac{t}{2}}{R_c+\frac{t}{2}}$$

which is very nearly equal to $t/2R_c$, i.e., $\Delta V/V_s \approx t/2R_c$, inasmuch as $t/2$ is substantially less than $R_c$. Thus the linear speed of the tape at the take-up reel will be faster than the linear speed of the tape at the supply reel by the ratio $\Delta V/V_s$, i.e., the fundamental mechanism that produces tension in the tape as it moves from the supply reel to the take-up reel. $\Delta V/V_s$ also equals $\Delta L/L$ where $\Delta L$ is the change in length per unit time and L is the length of the tape portion transported in the unit time. Consequently $\Delta L/L$ also equals $t/2R_c$.

If the drive belt 21 were missing and the tape 22 were reeved over the capstans 15 and 16 and were transported from supply reel 13 to take-up reel 14 there would, of course, be no tension, essentially, developed in the tape 22 inasmuch as the drive friction of the capstans 15 and 16 and of the reels 13 and 14 would be very nearly zero, i.e., frictionless. It is the presence of the belt 21 with an initial tension $T_{BO}$ in it that enables the drive mechanism, as shown, to develop tension in the tape 22 as it moves from the supply reel to the take-up reel.

Irrespective of the direction in which the tape is moving from one reel acting as a supply to another reel acting as a take-up and in the reverse direction, the tension in the tape will remain constant.

Inasmuch as the take-up reel is always tending to run faster than the supply reel, not only will the tape tension remain and be constant, but initially any slack which might exist in the tape will be taken up and removed and thereafter no slack will exist in the tape in its movements.

The factors which determine the tape tension are the dimensions, Young's modulus, and thickness of the drive belt and the radius of the capstans. Stated mathematically, $T_T = E_T A_T (\Delta L/L)$, where $T_T$ is tape tension, $E_T$ is Young's modulus for the tape, $A_T$ is the cross-sectional area of the tape and $\Delta L/L$ is the change in length per unit length of the tape. In other words the tension in the tape is a function of the physical characteristics of the system and there is no relationship to the speed of the tape, the dimensions of the reels or the inventory of the tape thereon. The tension to be developed in the tape can be designed into the system by the appropriate choice of the dimensions and characteristics of the component parts. A great variety of design choices are therefore available, according to the invention.

As the tape 22 moves from one reel, for example, 13, to the other reel, for example, 14, the proper positions and contact pressures for the tape inventory with the capstans and belt must be maintained. Contact pressure must be maintained at point 35 between the capstan 16 and the tape periphery on the take-up reel 14 to secure a non-slip drive. The periphery of the tape on the supply reel 13 must ride on the belt alongside point 36 with sufficient pressure to prevent slip at this point, but the periphery of the tape must not contact the capstan 15. These requirements are met by the linkage mechanism which supports the supply and take-up reels, The linkage comprises a four-bar-linkage including the two tape-reel level arms 11 and 12, the tie rod 37, or link, and the material 38 of the supporting structure 10 to which the pivots 39 and 41 of the lever arms 11 and 12 are attached, the lever arm 11 pivoting about pivot 39 and the lever arm pivoting about pivot 41. The reel 13 is pivotally mounted by pivot 42 to one end of the lever arm 11 and the reel 14 is pivotally mounted by means of pivot 43 to one end of the lever arm 12. The tie rod 37, as shown, is threaded at each end and one each of the ends is received in the threaded coupling members 44 and 45 which are pivotally attached to the lever arms 11 and 12 respectively. The couplings 44 and 45 are disposed respectively between the pivots 39 and 42 and 41 and 43. The threads on tie rod 37 enable the distance between the pivot points 44 and 45 to be changed to conform to the particular requirements of the system. The pivot 42 of reel 13 moves in an arcuate groove 46 and the pivot 43 of reel 14 moves in an arcuate groove 47 about the respective pivots 39 and 41. The amount of movement of the pivots 42 and 43 is determined by the trapezoidal configuration of the linkage including the length of tie rod 37 between couplings 44 and 45 on the arms 11 and 12, and the distance between the pivots 39 and 41, as well as the distance between the pivots 39 and 44 and pivots 41 and 45. The distance between pivots 39 and 42 and pivots 41 and 43 also enter the relationship.

The tape reels are thus rigidly coupled together. The kinematic design of the four-bar-link is such that only slight relative displacement occurs between the reels as the tape transfers fully from one reel to the other. The compliance of the belt easily accommodates the requisite displacement without significant change in preload pressure.

The rigid-four-link also facilitates counterbalancing of the tape mass. Counterbalancing may be required to reduce the effect of environmentally induced inertia forces. The tie rod 37 acts to distribute the required counterbalancing force no matter how much tape mass is on which reel. In order to minimize the amount of counterbalance force that must be transferred by the tie rod, half of the counterbalance weight can be placed on each lever arm. That is to say the counterbalance weight 48 at the end of lever arm 11 and the counterbalance weight 49 at the end of the lever arm 12 each amount to one-half of the counterbalance weight needed. This will also minimize the local inertia loads induced by the weights.

The drive belt tension and the wrap-angle on the supply reel act together to generate a radial force on the supply reel. This force is transmitted through the tie rod resulting in a contact pressure between the take-up reel and its capstan. This pressure is of nearly constant magnitude because the belt tension and the wrap-angle are constant. The positions of the reels, at any given condition of tape dispostion is fixed by the rigid contact between the take-up reel and its capstan.

For proper and efficient operation the take-up reel must be edge-driven as for example reel 14 and capstan 16 at point 35 in FIG. 3 and the supply reel must be belt-driven as for example reel 13 and the belt in the vicinity of point 36 in FIG. 3. For a bi-directional tape transport the differential belt, 21, has to be placed into the proper position to achieve this condition. In FIG. 3 the dotted line position of the idler roller 19 and the dotted line position of the belt 21 show the positions of the components for the reverse direction of operation, that is, when the reel 14 and the tape thereon is acting as the supply reel and the reel 13 with, in effect, no tape thereon is acting as the take-up reel.

Proper timing of the changeover is very important. Therefore the changeover is synchronized with or, more preferably, is controlled by the drive motor 18. The drive motor 18 is on the same shaft as the pulley 17 as shown in FIGS. 2, 3 and 4, drives the belt 21 in the counterclockwise direction as shown by the solid lines in FIG. 3, and upon reversal of direction, drives the belt 21 in the clockwise direction as shown by the dotted lines in FIG. 3.

Figure 8:
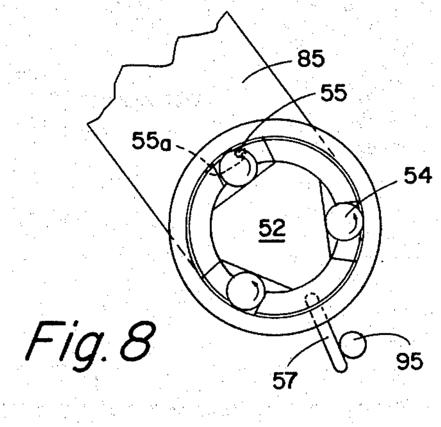
FIG. 8 is a sectional view taken substantially in the direction of the arrows 8—8 of FIG. 7.
Figure 7:
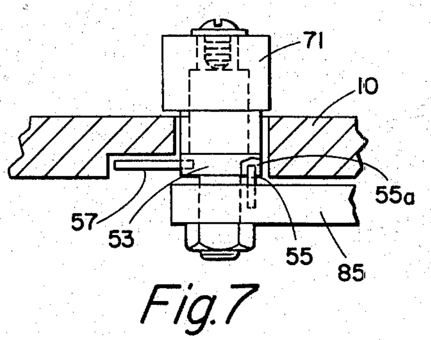
FIG. 7 is a sectional view of one component of the apparatus according to the invention.

The changeover in direction is achieved by means of a reversible one-way clutch 51 which is combined with the idler roller 19, as shown more particularly in FIGS. 7 and 8. The clutch 51 functions so that the idler 19 is free to roll when the idler is in the proper position as shown by the solid lines in FIG. 3 and is locked when the tape direction is reversed as when it is intended that the idler 19 more from the position shown by the solid lines to the position shown by the dotted lines. With the idler locked by the one way clutch mechanism 51, the belt 21 which now tends to rotate in the clockwise direction will pull the idler 19 over to the position shown dotted. The idler roller 19 is rotatably mounted on the arm 56 which in turn is pivotally mounted, for example, about the center of the drive roller. The one-way clutch mechanism 51 prevents rotation of the idler 19 until the idler reaches the position shown by the dotted lines. At this position, the arm, or finger, 57 attached to the shaft of the one-way clutch mechanism 51 engages the pin or abutment, 58 which releases the one way clutch. Accordingly the one-way clutch is released and the belt 21 is free to rotate in the clockwise direction. It thus reverses the direction of rotation of reels 14 and 13.

As may be seen in FIG. 3 by the belt position shown dotted, the reel 14 now does not engage the capstan 16 at the point 35 but rather engages the portion of the belt 21 in the vicinity of the point 59, and the inventory of tape on reel 14 is now belt-driven. Now, also, as may be seen in FIG. 3, the inventory of tape 23 on the reel 13 engages the capstan 15 and the belt 21 at the point 61, i.e. the inventory of tape 23 on reel 13 is edge-driven. For this to occur, the linkage mechanism causes the reels to shift slightly as shown by the dotted arc and reference character 23A. After the inventory of tape on reel 14 is reduced to a minimum, the time arrives when the position of the reels must again be reversed, that is the reel 14 becomes the take-up reel and the reel 13 the supply reel. For this condition to occur, the motor direction is again reversed by appropriate switches and the one-way clutch mechanism 51 in the position shown dotted locks and the belt 21 shown dotted causes the idler 19 to move to the solid line position again at which the arm or finger 57 strikes an abutment 62 for releasing the one-way clutch. Consequently, the reels are in position for operation as already described when the reel 13 is the supply reel and the reel 14 is the take-up reel.

As described with the idler locked the belt will pull the lever over to the proper position by an over-center action. That is, the belt moves the idler 19 and the one-way clutch 51 to about the extreme downward position when the pivotally mounted arm 56 suddenly flips to the extreme position of the direction in which it is moving. The moment the idler is in the proper position for reversed tape motion the clutch is released, which means free running in the tape direction and locked when reversed. Cushioning pieces of soft material such as sponge rubber 63 and 64 are disposed adjacent the extreme positions of the arm 56 in order to prevent any bouncing of the idler 19 when the overcenter action moves the idler 19 with a snap.

The apparatus may be started by operating a switch 65 for energizing the motor 18.

Limit switches shown schematically as 66 and 67 are disposed adjacent the ends of lever arms 11 and 12. When the tape inventory 24 on reel 14 is reduced to a minimum the limit switch 66 is actuated to cause the motor 18 to reverse thereby placing the belt 22 and the roller 19 in the position shown in solid lines in FIG. 3. When all or substantially all of the tape inventory 23 has been removed from reel 13 the limit switch 67 will be contacted by the lever arm 11 thereby reversing the motor and causing the belt and idler roller 19 to assume the position illustrated by the dotted lines.

Figure 5:
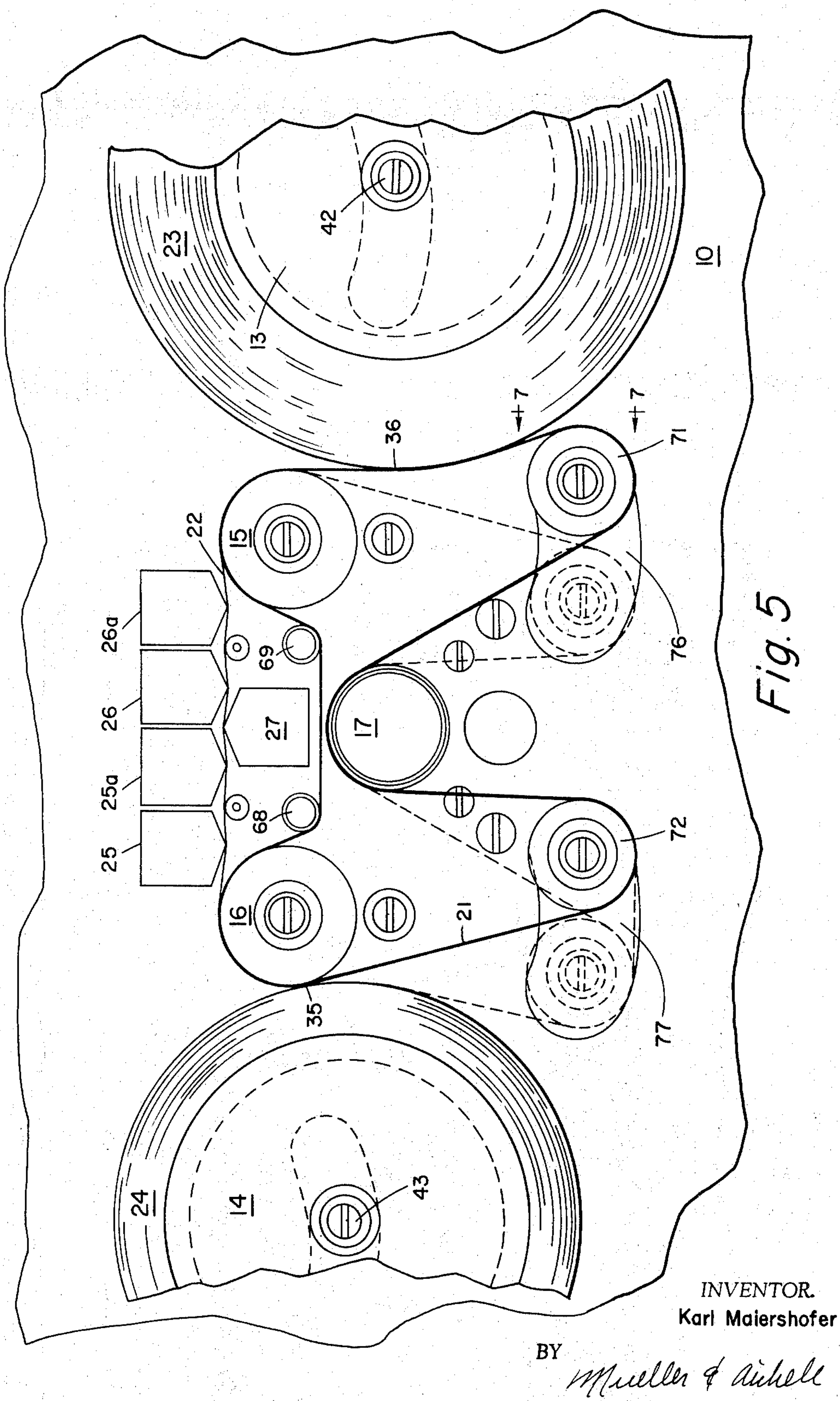
FIG. 5 is a fragmentary top plan view of another embodiment of the invention.
Figure 6:
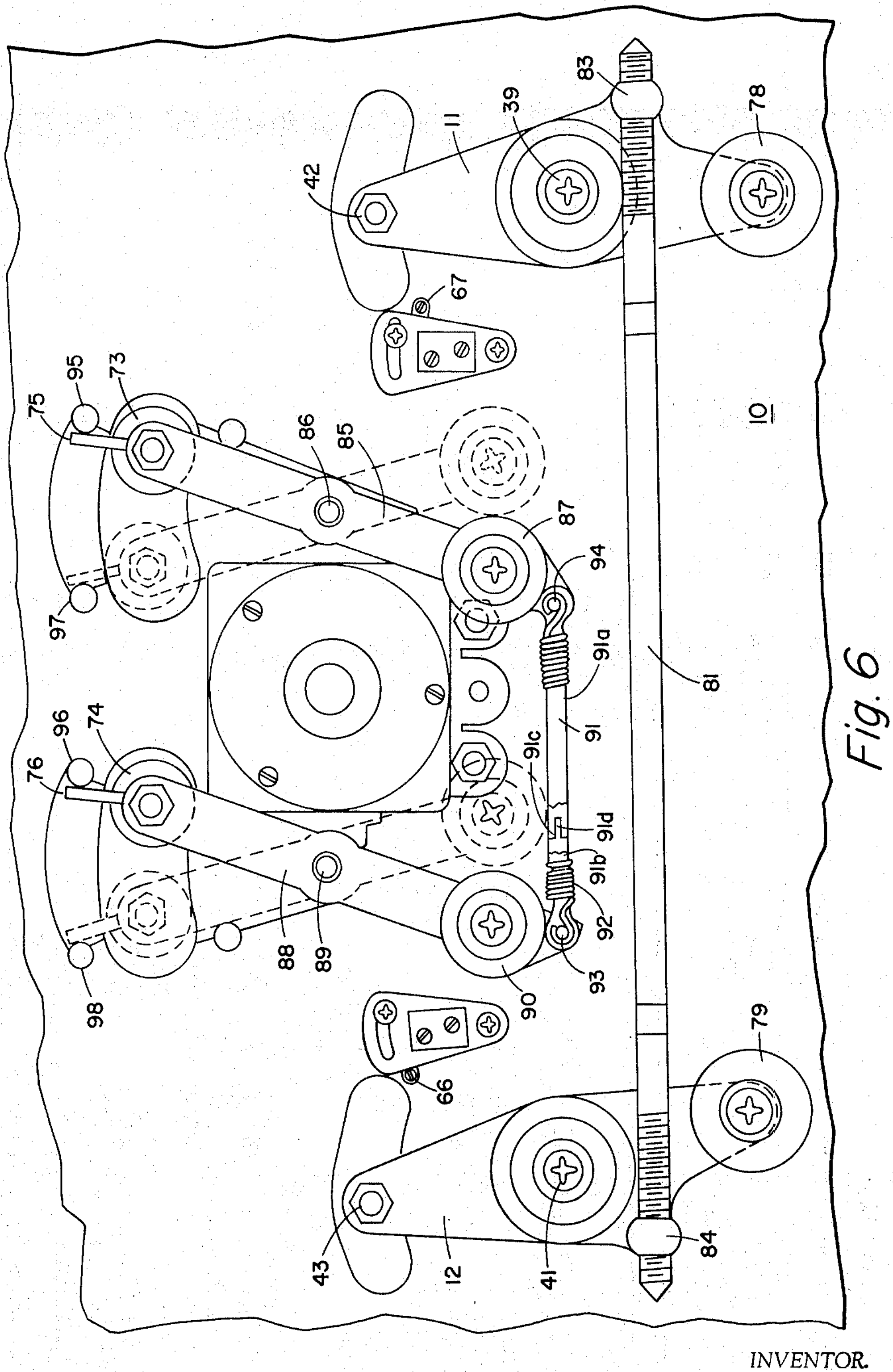
FIG. 6 is a fragmentary bottom view of the apparatus shown in FIG. 5.

Referring to FIGS. 5 and 6 there is shown a further version of the tape recorder, according to the invention, which has a modified four-bar-linkage mechanism, making it possible to better counterbalance the system when tape or other web material is transported from a supply reel to a take-up reel. In addition, the idler rollers and one-way clutch mechanisms are counterbalanced in a manner to improve the operation from the standpoint of response to acceleration forces and the like. For corresponding parts, the same reference characters will be used in FIGS. 5 and 6 as were used in FIGS. 2, 3 and 4.

Thus in FIG. 5 a supply reel 13 and a take-up reel 14 are shown mounted on a supporting structure 10. An inventory of tape 23 exists on supply reel 13 and an inventory of tape 24 exists on take-up reel 14. The tape 22 is shown moving past recorder heads 25 and 25A, playback heads 26 and 26A and erase head 27, pins 28 and 29 being disposed to hold the tape in position against the erase, playback and record heads (transducing heads). In FIG. 5, two record heads 25 and 25A are shown inasmuch as approximately 30 channels of recording are desired to be disposed upon a tape one half inch wide and the location of 30 coils in the space of half of an inch is not practical. Accordingly, one half or approximately 15 record coils are placed on head 25 and the other 15 record heads are placed on head 25A, different ones of the record heads being displaced or interleaved, so to speak, with respect to each other. Similarly, one half of the playback coils are arranged in head 26 and the other half are disposed in head 26A.

A drive motor 18 is connected to a drive pulley 17 and a drive belt 21 is reeved around the capstans 15 and 16, guide rollers 68 and 69, the drive pulley 17 and idler rollers 71 and 72 are arranged as shown and are identical, in effect, to idler 19 of FIG. 3. The drive belt 21 is reeved as shown around drive pulley 17 to lessen the force required to change the direction of movement of belt 21. The guide rollers 68 and 69 keep belt 21 away from erase head 27.

Reversible one-way clutches 73 and 74 are associated respectively with idlers 71 and 72 and correspond to the reversible one-way clutch 51 of FIGS. 2 and 3. However, in the form shown in FIGS. 5 and 6, the one-way clutches 73 and 74 including the fingers or arms, 75 and 76 for releasing the one-way clutches when the direction of movement of the tape is to occur are mounted on the rear of the supporting structure 10 rather than on the front.

Referring to FIGS. 7 and 8 for more specific construction of one form of the reversible one-way clutch, it will be seen that the clutch comprises a three-sided shaft 52, a control cage 53, three cylindrical rollers 54 and a stop 55. The stop 55 is fixed to arm 85 and is adapted to engage the sides of a groove 55A in the control cage. The flat sides 52A of the shaft 52 cooperate with slots 53A in the control cage 53 to form trapezoidal housings for the rollers 54. When the idler 71 is rotating counterclockwise, as shown in FIG. 8, the rollers move to the large end of the trapezoidal housing and the idler 71 is freewheeling.

When the idler 71 attempts to move clockwise, it move the rollers 54 into the small end of the trapezoidal housing causing the idler 71 and the shaft 52 to bind together. Thereupon, further clockwise movement of the belt 21 causes the arm 85 to move the dotted position of FIGS. 5 and 6. At this point the finger 75 engages the stop 97 which stops the movement of the control cage 53. However, the arm 85 (and the arm 88) and the shaft 52 continue to move until the stop 55 engages the left hand edge of groove 55A. At this point the trapezoidal housing has its large side facing in the direction of rotation of the idler and the rollers 54 are free. The idler 71 is now free to freewheel in the clockwise direction. In the right-hand position of the idler 71, shown in solid lines, the engagement of stop 55 with the right-hand edge of groove 55A releases the clutch for counterclockwise rotation of the idler 19.

The belt 21 is reeved around the capstans 15 and 16 and the idler rollers 72 and 71 as shown, the idler rollers 71 and 72 being adapted to move along arcuate grooves 76 and 77 respectively. The belt 21, as shown, in FIG. 5 edge drives the take-up reel 14 and the inventory of tape 24 at the point 35 and the belt 21 drives the reel 13 and the inventory of tape 23 thereon in the vicinity of point 36 all as described in connection with the apparatus shown in FIG. 3. The portion of the belt between the capstan 15 and the idler roller 71 of FIG. 5 engages the periphery of tape inventory 23 without the tape inventory engaging the capstan 15. In accordance with the invention, then, as shown in FIG. 5, the take-up reel is edge-driven by the capstan and the supply reel is belt-driven in order to provide the mechanism for supplying tension in the tape 21 as it moves from the supply reel to the take-up reel.

Referring to FIG. 6, it will be seen that the reel arm 11 is pivotally mounted to the support 10 at pivot 39 and the reel arm 12 is pivotally mounted to the support 10 at pivot 41. The reel 13 is rotatably mounted on the shaft or bearing, 42 and the reel 14 is rotatably mounted on the shaft or bearing, 43.

The disposition of pivots 39 and 41 with respect to the bearings 42 and 43 forms, essentially, a parallelogram. That is to say the distance between the pivots 39 and 41 is essentially the same as the distance between the bearings 42 and 43. Similarly the distance between the points 39 and 42 is essentially the same as that between points 41 and 43. The parallelogram arrangement of these mounting points is more conducive to the accurate counterbalancing of the mechanism. In accordance therewith counterbalance weights 78 and 79 are mounted at the other ends of the arms 11 and 12 respectively. Accordingly, any tendency for inertia forces to exist during acceleration of devices carrying the tape recorder will be properly counterbalanced and less distortion will be introduced into the movement of the tape from one reel to the next as the tape is transported and less tape appears on one reel and more tape appears on the other.

In order to be certain that the points of contact 35 and 36 remain the same, that is, have the same contact pressure irrespective of how much inventory of tape exists on which reel the rigid link 81 is connected between arms 11 and 12. As described in connection with the earlier embodiment, the rigid link 81 is threaded at each end and is received and pivotally mounted in threaded coupling members 83 and 84 which are pivotally mounted on the arms 11 and 12. The arms 11 and 12, the link 81 and the supporting structure 10 constitute a four-bar linkage as already described. Limit switches 66 and 67 are also mounted, as shown, for cooperation with the lever arms 12 and 11 respectively in order to reverse the direction of tape transport when this is called for by the mechanism.

The idler roller 71 and the cooperating one-way clutch 73 are mounted at one end of an arm or link 85 (FIG. 6), the arm 85 being mounted on a pivot 86. At the other end of arm 85 there is a weight 87 for counterbalancing, in essence, the weight of the roller 71 and the one-way clutch 73. Correspondingly, the idler roller 72 and its cooperating one-way clutch 74 are mounted at one end of arm 88 which is pivoted at 89. At the other end of arm 88 there is a weight 90 for counterbalancing, in essence, the weight of the idler roller 72 and the one-way clutch mechanism 74.

To complete the essentially parallelogram linkage as just described a split rod 91 and a coupling spring 92 are connected to pins 93 and 94 attached to the remote end of the arms 85 and 88 respectively. The arm 91 consists of two parts 91A and 91B which are split, as shown at 91C one portion 91D of part 91B interfitting with a corresponding elongated hole in part 91A. The spring 92 holds the two parts 91A and 91B together but permits slight movement as may be needed when the two arms 85 and 88 move under the influence of the belt 21 to shift the idler rollers 71 and 72 from one position to the next as called for by the automatic reversibility of the tape direction when the motor changes its direction of rotation as already described in connection with the preceding embodiment. The mounting points 93 and 94 are offset inwardly from the axes so to speak of the arms 85 and 88 for a purpose to be described. The link bar 91 prevents the idler rollers 71 and 72 from moving any farther apart than is permitted by this link, but these members may move closer together slightly by permitting the spring 92 to expand and the two portions of the rod 91A and 91B to move apart slightly as may be necessary. The parallelogram (trapezoidal) overall linkage mechanism including the arms 85 and 88 and the split bar 91 enable the mechanism to be more accurately counterbalanced. Thus it may be observed in comparing FIGS. 5 and 6 that when an inertia force operates upon the idler roller 71 and the one-way clutch 73 a similar but counteracting force operates upon the idler roller 72 and the cooperating one-way clutch 74. No net displacement of the idler rollers 71 and 72 relative to each other takes place, therefor.

The split at 91C may be located during design and construction to position the idler rollers 71 and 72 so as to provide the desired tension in the belt 21.

In FIG. 5 the belt 21 shown in solid lines is assumed to be travelling in the counterclockwise direction, consistent with the idea that the reel 13 is the supply reel and the reel 14 is the take-up reel. Under this condition the rollers 71 and 72 are rotating counterclockwise as idlers and the one-way clutches 73 and 74 are in their release positions because the fingers 75 and 76 are against the abutments 95 and 96. When the reels 13 and 14 reverse their directions, the reel 14 becoming the supply reel and the reel 13 becoming the take-up reel, the limit switch 67 is actuated to reverse the direction of motor 18. Under the influence of the belt 21 reversing its direction to move clockwise the one-way clutches 73 and 74 take hold and momentarily prevent the belt from moving relative to the rollers 71 and 72, and instead the whole linkage mechanism including the arms 85 and 88 moves clockwise to the position where the drive belt 21 is shown by the dotted lines and the arms 85 and 88 are shown in dotted lines. In this position the pins 75 and 66 engage the stops 97 and 98 thereby releasing the one-way clutches 73 and 74 and permitting the belt 21 to run in the clockwise direction as claimed for by the operation of the apparatus. As has already been pointed out, this change in direction of the belt and consequently the change in direction of the supply reel and take-up reel is automatic with the change in direction of rotation of the motor and there is no loss of tension in the tape 22 as it moves past the transducing heads.

Figure 1:
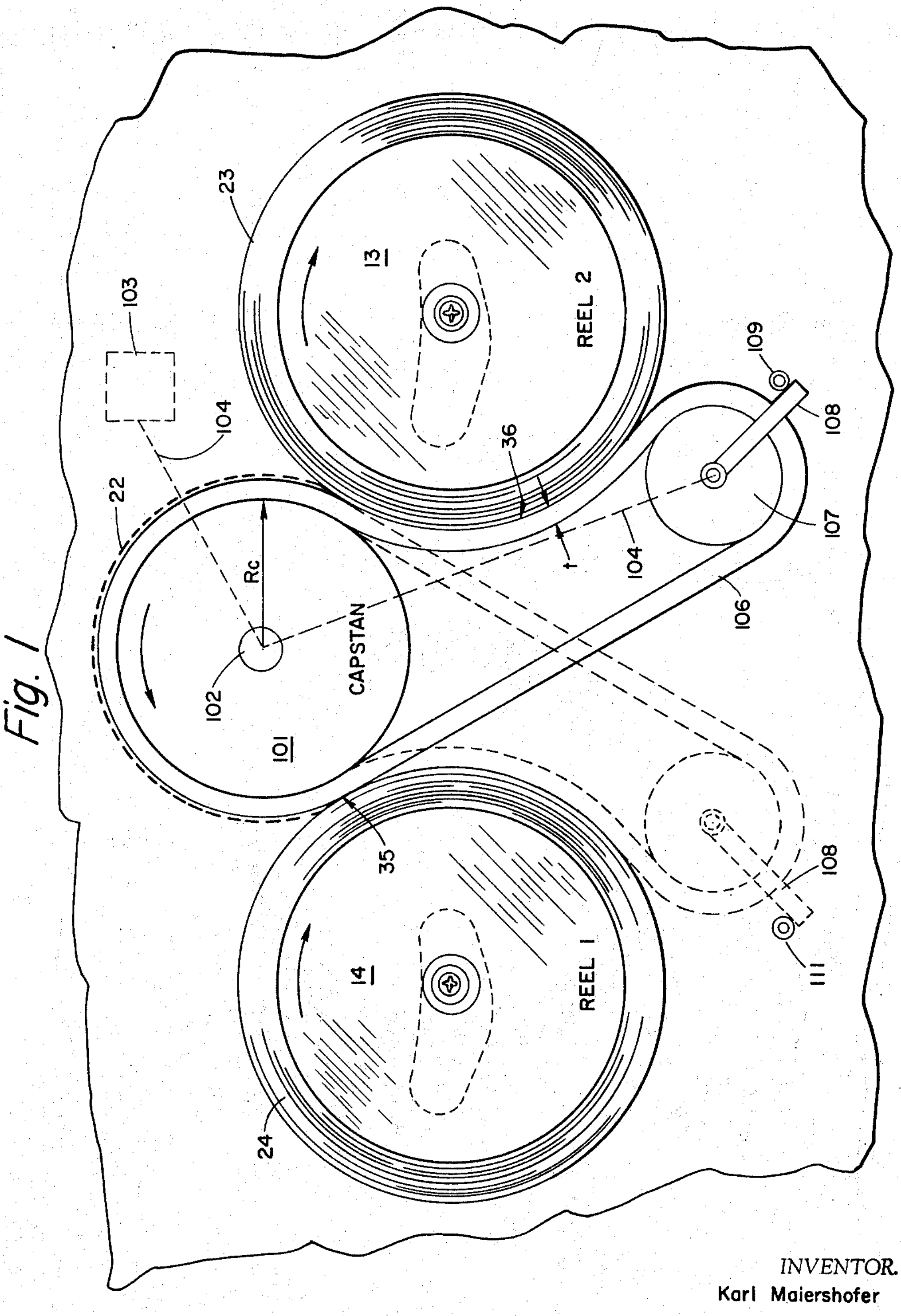
FIG. 1 is a diagrammatic top view of apparatus embodying the invention.

In each of the two embodiments thus far described, two capstans 15 and 16 have been shown. This is not essential but appropriate apparatus will function if only a single capstan is used and that capstan may be the pulley attached to the drive motor. Such an embodiment is shown in FIG. 1. In this embodiment, to the extent applicable, the same reference characters are used as in the preceding figures. Thus in the embodiment of FIG. 1, there is shown a supply reel 13 with an inventory of tape 23 thereon and a take-up reel 14 with an inventory of tape 24 thereon. A single capstan 101 is shown mounted on a shaft 102, the capstan being driven by any suitable drive motor shown dotted 103 mounted on the connecting shaft 102. An idler roller 105 is appropriately positioned relative to the capstan 101, and, for example, may be mounted on the support structure 10 on a radial arm 104 (shown dotted) utilizing the shaft 102 as a center. Reeved around capstan 101, and idler roller 105 is a flexible belt 106. The tape 22 in moving from supply reel 13 to take-up reel 14 is shown spaced away slightly from that portion of the flexible belt 106 that moves around the capstan 101 in the interest of clarity.

In the position of the belt 106 shown in solid lines in FIG. 1, it will be observed that at the point 35 the take-up reel 14 is in edge contact with the capstan 101 through the thickness of the belt 106. Similarly, the supply reel with the inventory of tape 23 thereon has a periphery of the tape in contact with the belt 106 at point 36 which is between the capstan 101 and the idler 105. At no point is the periphery of the tape 23 on supply reel 13 in contact with the capstan 101. Thus in the embodiment of FIG. 1, the take-up reel 14 is edge-driven and the supply reel 13 is belt-driven, thereby providing the differential in speed of movement determined by one-half the thickness of the belt. Accordingly, the mechanism for developing tension in the tape 22 as it moves from the supply reel to the take-up reel is present and the invention functions as already described.

The idler roller 105 includes a one-way clutch 107 similar to those already described and a finger 108 is provided for releasing the one-way clutch when the finger abuts against a stop 109 for operation in the direction as shown by the solid lines of the belt 106. When the mechanism calls for the direction of the tape to be reversed, the one-way clutch 107 takes hold and momentarily prevents belt movement. Accordingly the idler 105 is caused to change from the position shown in solid lines to the position shown in dotted lines and in so doing when the finger 108 engages the stop 111 the one-way clutch is released and operation of the reel 14 becomes the supply reel and the reel 13 becomes the take-up reel. Accordingly, it is evident that the invention will function with one or more capstans and one or more idler rollers.

What is claimed is:

1. Apparatus for rotatably driving two reel members each supported on its own shaft comprising a capstan and a roller, a drive belt free of encompassing said reel members and disposed around said capstan and said roller, means for driving said belt, one of said reel members being disposed with its peripheral surface tangentially against said belt at a point where it is in engagement with said capstan but is extending directly toward said roller, and the other of said reel members being disposed with its peripheral surface against said belt at a point directly between said capstan and roller but where it is free of engagement with both of said capstan and said roller.

2. Apparatus for rotatably driving two reel members each supported on its own shaft with a constant difference in speed between such members comprising, a capstan and a roller, a belt free of encompassing said reel members and disposed around said capstan and said roller, means for driving said belt, one of said reel members being disposed with its peripheral surface tangentially against said belt at a point where it is in engagement with said capstan but is extending directly toward said roller, and the other of said reel members being disposed with its peripheral surface against said belt at a point directly between said capstan and roller but where it is free of engagement with both of said capstan and said roller.

3. Apparatus for rotatably driving two reel members each supported on its own shaft while developing a substantially constant tension in a web member running from one reel member to the other comprising, a pair of spaced pivotably mounted arms, the shaft supporting one of said reels being mounted on one of said arms displaced from the pivot of said one arm, the shaft supporting the other one of said reels being mounted on the other of said arms displaced from the pivot of said other arm, a capstan and a roller, a belt free of encompassing said reel members and disposed around said capstan and said rollers, means for driving said belt, one of said reel members having an inventory of said web member thereon and being disposed with the periphery of said web member tangentially against said belt at a first location where said belt is in engagement with said capstan but is extending directly toward said roller, the other of said reel members having the remaining inventory of said web member thereon and being disposed with the periphery of said remaining web member against said belt at a second location directly between said capstan and roller but where said belt is free of engagement with both of said capstan and said roller, and rigid linkage means connecting said pair of pivotably mounted arms at points displaced from said reel shafts and the pivots of each of said pair of arms for effecting movement of said reels to maintain the respective points of engagement of said web member with said first and second locations as the inventory of web member changes from one of said reels to the other while said reels are being driven.

4. The apparatus according to claim 3 including means for changing direction of rotation of said two reels in response changing direction of the rotation of the means for driving said belt.

5. The apparatus according to claim 4 wherein said idler roller is movable on a predetermined radius from a first position to a second position, and upon change of said idler roller from said first position to said second position, said linkage effects change of said first location to the other of said reels and said second location to said one of said reels.

6. The apparatus according to claim 5 wherein said idler roller includes a reversible one-way clutch means operative upon change in direction of rotation of the means for driving said belt to prevent rotation of said idler roller, and including means for releasing said one-way clutch upon said roller reaching its other position.

7. Apparatus for rotatably driving two reel members each supported on its own shaft while developing a substantially constant tension in a web member running from one reel member to the other comprising:

- a pair of spaced pivotably mounted arms, the shaft supporting one of said reels being mounted on one of said arms displaced from the pivot of said one arm, the shaft supporting the other one of said reels being mounted on the other one of said arms displaced from the pivot of said other arms;
- a first capstan;
- a second capstan;
- an idler roller;
- a belt free of encompassing said reel members and disposed around said first and said second capstans and said idler rollers;
- means for driving said belt;
- one of said reel members having an inventory of said web member thereon and being disposed with the periphery of said inventory of web member tangentially against said belt at a first location where said belt is in contact with the periphery of one of said first and second capstans but is extending directly toward said idler roller;
- the other of said reel members having the remaining inventory of said web member thereon and being disposed with the periphery of said remaining inventory of said web member against said belt at a second location where said belt is directly between the other one of said first and second capstans and said idler roller and the periphery of said remaining inventory of web member is free of engagement with both of said other one of said capstans and said idler roller;
- and rigid linkage means connecting said pair of pivotably mounted arms at points displaced from said reel shafts and the pivots of each of said pair of arms for effecting movements of said reels to maintain the respective points of engagement of the peripheries of the inventories of said web member with said first and second locations as said inventory of said web member changes from one of said reels to the other while said reels are being driven.

8. Apparatus for rotatably driving two reel members each supported on its own shaft while developing a substantially constant tension in a web member running from one reel member to the other comprising:

- a pair of spaced pivotably mounted arms, the shaft supporting one of said reels being mounted on one of said arms displaced from the pivot of said one arm, the shaft supporting the other one of said reels being mounted on the other one of said arms displaced from the pivot of said other arm;
- a first capstan;
- a second capstan;
- an idler roller;
- a belt free of encompassing said reel members and disposed around said first and said second capstans, and said idler roller;
- means for driving said belt;
- one of said reel members being adapted to have an inventory of said web member thereon and being adapted to have the periphery of said inventory of web member tangentially against said belt at a first location where said belt is in contact with the periphery of one of said first and said second capstans but is extending directly toward said idler roller;
- the other one of said reel members being adapted to have the remaining inventory of said web member thereon and being adapted to have the periphery of the remaining inventory of said web member against said belt at a second location where said belt is directly between the other one of said first and said second capstans and said idler roller and the periphery of said remaining inventory of web member is free of engagement with both of said other one of said capstans and said idler roller;
- and rigid linkage means connecting said pair of pivotably mounted arms at points displaced from said reel sahfts and the pivots of each of said pair of arms for effecting movements of said reels to maintain the respective points of engagements of the peripheries of the inventories of said web member with said first and second locations as said inventory of said web member changes from one of said reels to the other while said reels are being driven.

9. The apparatus according to claim 7 including means for changing the direction of rotation of said two reels in response to changing direction of rotation of the means for driving said belt.

10. The apparatus according to claim 7 wherein said idler roller is movable on a predetermined radius from a first position to a second position; and upon change of said idler roller from said first position to said second position, said linkage effects change of said first location to the other of said reels and said second location to said one reel.

11. The apparatus according to claim 10 wherein said idler roller includes a reversible one-way clutch means operative upon change in direction of rotation of the means for driving said belt to prevent rotation of said idler roller, and including means for releasing said one-way clutch upon said idler roller reaching its other position.

12. The apparatus according to claim 7 including a drive pulley;

said drive means is connected to said drive pulley;

said idler roller is pivotably mounted with the center of said drive pulley as a center and said drive belt is reeved around said first and second capstans, said idler roller, and said drive pulley.

13. Apparatus for rotatably driving two reel members each supported on its own shaft while developing a substantially constant tension in a web member running from one reel member to the other comprising:

a pair of spaced pivotably mounted arms, the shaft supporting one of said reels being mounted on one of said arms displaced from the pivot of said one arm, the shaft supporting the other one of said reels being mounted on the other one of said arms displaced from the pivot of said other arm;

a first capstan;

a second capstan;

a first idler roller;

a second idler roller;

a belt disposed around said first and said second capstans and said first and said second idler rollers;

means for driving said belt;

said first capstan and said first idler roller being companions in one operative unit and said second capstan and said second idler roller being companions in a second operative unit;

one of said reel members having an inventory of said web member thereon and being disposed with the periphery of said web member against said belt at a first location where said belt is in contact with the periphery of one of said first and said second capstans and its companion idler roller;

the other one of said reel members having the remaining inventory of said web member thereon and being disposed with the periphery of said remaining web member against said belt at a second location where said belt is between the other one of said first and second capstans and its companion roller and the periphery of said remaining inventory of web member is free of engagement with said other one of said capstans and its companion roller;

and rigid linkage means connecting said pair of pivotably mounted arms at points displaced from said reel shafts and the pivots of each of said pair of arms for effecting movement of said reels to maintain the respective points of engagement of the peripheries of the inventories of said web member with said first and second locations as said inventory of said web member changes from one of said reels to the other while said reels are being driven.

14. Apparatus for rotatably driving two reel members each supported on its own shaft while developing a substantially constant tension in a web member running from one reel member to the other comprising:

a pair of spaced pivotably mounted arms, the shaft supporting one of said reels being mounted on one of said arms displaced from the pivot of said one arm, the shaft supporting the other one of said reels being mounted on the other one of said arms displaced from the pivot of said other arm;

a first capstan;

a second capstan;

a first idler roller;

a second idler roller;

a belt disposed around said first and said second capstans and said first and said second idler rollers;

means for driving said belt;

said first capstan and said first idler roller being companions in one operative unit and said second capstan and said second idler roller being companions in a second operative unit;

one of said reel members being adapted to have an inventory of said web member thereon and being disposed with the periphery of said web member against said belt at a first location where said belt is in contact with the periphery of one of said first and said second capstans and its companion idler roller;

the other one of said reel members being adapted to have the remaining inventory of said web member thereon and being adapted to have the periphery of the remaining web member against said belt at a second location where said belt is between the other one of said first and second capstans and its companion roller and the periphery of said remaining inventory of web member is free of engagement with said other one of said capstans and its companion roller;

and rigid linkage means connecting said pair of pivotably mounted arms at points displaced from said reel shafts and the pivots of each of said pair of arms for effecting movement of said reels to maintain the respective points of engagement of the peripheries of the inventories of said web member with said first and second locations as said inventory of said web member changes from one of said reels to the other while said reels are being driven.

15. The apparatus according to claim 13 including means for changing the direction of rotation of said two reels in response to changing the direction of rotation of the means for driving said belt.

16. The apparatus according to claim 15 wherein said first idler roller is movable on a predetermined radius from a first position to a second position; said second idler roller is movable on a predetermined radius from a first position to a second position; and upon change of said first and second idler rollers from their respective first positions to their respective second positions, said linkage effects change of said first location to the other of said reels and said second location to said one reel.

17. The apparatus according to claim 16 wherein said first and second idler rollers each include a reversible one way clutch means operative upon change of direction of the means for driving said belt to prevent rotation of said first and second idler rollers, and means for releasing said one way clutches upon said first and second idler rollers reaching their respective second positions.

18. The apparatus according to claim 17 including a linkage mechanism joining said first and second idler rollers for effecting the change of said first and second idler rollers from their respective first positions to their respective second positions at the same time.

19. The apparatus according to claim 18 including a drive pulley;

said drive means is connected to said drive pulley;

said first idler roller is pivotally mounted on a center adjacent said second capstan;

said second idler roller is pivotally mounted on a center adjacent said first capstan;

said drive belt is reeved around said first and second capstans, said first and second idler rollers, and said drive pulley; and the linkage connecting said first and second idler rollers and the said pivoted centers of said first and second idler rollers comprises essentially a parallelogram linkage.

20. The apparatus according to claim 19 wherein said parallelogram linkage includes a pair of arms, one of said pair of arms is pivoted on the pivot mounting of said second idler roller and includes said second idler roller mounted on one end, the other one of said pair of arms is pivoted on the pivot mounting of said first idler roller and includes said first idler roller mounted on one end;

each of said pair of arms includes an extension directed opposite to the ends on which said first and second rollers are mounted, and each extension includes an end; and an expansible and contractable link pivotally connecting said extended ends for completing essentially said linkage.

21. The apparatus according to claim 20 wherein said expansible and contractable link includes a split rod and a spring for biasing the split rod portions together, and wherein the pivotal connections of said link and said extended ends are inwardly of the axes of said arms.

22. The apparatus according to claim 21 whereby said linkage comprises an overcenter mechanism effecting snap action in the movement of said first and second idler rollers from one position to the other.

23. The apparatus according to claim 20 wherein each of said extensions includes a counterbalance weight.

24. The apparatus according to claim 3 wherein each of said pivotally mounted arms includes an extension on the opposite side of the arm pivot from the reel shaft mounted thereon, and counterbalance means associated with said extensions.

25. The apparatus according to claim 24 wherein said counterbalance means includes weights of equal magnitude, one of each of which is mounted on each of said extensions.

26. The apparatus according to claim 5 wherein said idler roller is mounted at the end of an arm of predetermined radius.

27. The apparatus according to claim 26 wherein said idler roller and the belt disposed therearound comprises an overcenter mechanism effecting snap action in the movement of said idler roller from one position to the other.

28. The structure according to claim 12 wherein said idler roller and the drive belt comprise an overcenter mechanism effecting snap action in the movement of said idler roller from one position to the other.

29. In aparatus for transferring a web member from a first reel to a second reel, means for maintaining substantially constant tension in said web member, comprising:

capstan means, idler roller means, a drive belt free of encompassing said first and second reels and reeved around said capstan means and said idler roller means, said drive belt having a certain thickness and a predetermined tension therein, means for driving said belt;

a take-up reel adapted to have an inventory of tape thereon and movably mounted to bring the periphery of said inventory of web material tangentially against the belt around the periphery of said capstan but where it is extending directly toward said idler roller means;

a supply reel adapted to have the remaining inventory of web material thereon and movably mounted to bring the periphery of said remaining inventory of web material into engagement with said belt between said capstan means and said idler roller means and is free of engagement with both said capstan and said idler roller means; and a spring free mounting and linkage means for said take up reel and said supply reel for maintaining the inventory of web material on said take-up reel against the belt on said capstan means and the inventory of web material on said supply reel against said belt between said capstan means and said idler roller means.

30. A magnetic tape recording and reproducing mechanism comprising:

a supply reel adapted to have an inventory of tape thereon, a take-up reel adapted to have an inventory of tape thereon, means for transferring tape from said supply reel to said take-up reel;

transducing means disposed to be engaged by said tape as it is transferred from said supply reel to said take-up reel;

means for maintaining substantially constant tension in said tape comprising capstan means, idler roller means; a drive belt free of encompassing said supply and take-up reels reeved around said capstan means and said idler roller means;

said drive belt having a certain thickness and a predetermined tension therein;

means for driving said belt;

mounting means for said supply reel, pivotally arranged for bringing the periphery of the inventory of tape on said supply reel into a tangential position against the belt on said capstan means but is extending directly toward said idler roller means;

mounting means for said take-up reel, pivotally arranged for bringing the inventory of tape on said take-up reel into position against the belt between said capstan means and said idler roller means and is free of engagement with both said capstan means and said idler roller means; and rigid linkage means connecting said mounting means for holding said supply reel and said take-up reel in said positions.

31. The apparatus according to claim 13 wherein travel limiting means are mounted adjacent each of said pivotally mounted arms;

and means responsive to the positioning of the arm carrying the reel which is supplying the web when the web is reduced to a predetermined minimum for reversing the direction of web travel.

32. The apparatus according to claim 31 wherein said travel limiting means comprises electrical limit switches for energizing the means for driving said belt.

33. The apparatus according to claim 3 wherein said reels are rigidly coupled by a four-bar-link.

* * * * *